United States Patent
Jeong et al.

(10) Patent No.: US 12,204,529 B2
(45) Date of Patent: Jan. 21, 2025

(54) VIRTUAL ACCESS TO PARAMETERIZED DATA OBJECTS

(71) Applicant: SAP SE, Walldorf (DE)

(72) Inventors: Juhyeon Jeong, Seoul (KR); Hyeong Seog Kim, Seoul (KR); Taehyung Lee, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/973,077

(22) Filed: Oct. 25, 2022

(65) Prior Publication Data
US 2024/0134849 A1 Apr. 25, 2024
US 2024/0232186 A9 Jul. 11, 2024

(51) Int. Cl.
*G06F 16/24* (2019.01)
*G06F 16/242* (2019.01)
*G06F 16/2453* (2019.01)
*G06F 16/25* (2019.01)

(52) U.S. Cl.
CPC .... *G06F 16/2448* (2019.01); *G06F 16/24547* (2019.01); *G06F 16/256* (2019.01)

(58) Field of Classification Search
CPC ........... G06F 16/2448; G06F 16/24547; G06F 16/256
USPC ......................... 707/769, 770, 776, 797, 796
See application file for complete search history.

(56) References Cited

U.S. PATENT DOCUMENTS

| | | | | |
|---|---|---|---|---|
| 7,483,890 | B2 * | 1/2009 | Zhou | G06F 16/284 |
| 7,689,600 | B2 * | 3/2010 | Semerdzhiev | G06F 16/1787 |
| | | | | 707/999.203 |
| 7,836,065 | B2 * | 11/2010 | Hackmann | G06F 16/252 |
| | | | | 707/758 |
| 8,838,750 | B2 * | 9/2014 | Zenz | G06F 9/44505 |
| | | | | 709/219 |
| 8,868,594 | B2 * | 10/2014 | Baeumges | G06F 16/2457 |
| | | | | 707/718 |
| 9,284,236 | B2 * | 3/2016 | Catchpole | C07C 5/00 |
| 9,842,137 | B2 * | 12/2017 | Faerber | G06F 16/24542 |
| 10,146,834 | B2 * | 12/2018 | Baeumges | G06F 16/24554 |
| 10,146,843 | B2 * | 12/2018 | Sweeney | G06F 16/235 |
| 2005/0234878 | A1 * | 10/2005 | Dettinger | G06F 16/2425 |

(Continued)

OTHER PUBLICATIONS

Yang et al.,: Construction and research of virtual forest environment based of spatial data; ICBASE, 2021.*

*Primary Examiner* — Daniel A Kuddus
(74) *Attorney, Agent, or Firm* — Klarquist Sparkman, LLP

(57) ABSTRACT

Techniques and solutions are provided for providing federated data access to parameterized data objects. At a local system, a virtual parameterized data object is created. A remote computing system is contacted to obtain parameters used by a parameterized data object of the remote computing system to which the virtual parameterized data object corresponds. Parameter information received from the remote system is stored in a definition of the virtual parameterized data object at the local system. When a request for a database operation involving the virtual parameterized data object is received, the parameter information can be used to determine whether the request is correctly formed, or can be used in preparing a request to be sent to the remote system to be performed using the parameterized data object to obtain information specified in the request for a database operation.

20 Claims, 10 Drawing Sheets

(56) References Cited

U.S. PATENT DOCUMENTS

| | | | |
|---|---|---|---|
| 2007/0118553 A1* | 5/2007 | Zhou | G06F 16/284 |
| | | | 707/999.102 |
| 2007/0156789 A1* | 7/2007 | Semerdzhiev | G06F 16/1787 |
| 2013/0166589 A1* | 6/2013 | Baeumges | G06F 16/24532 |
| | | | 707/769 |
| 2013/0282746 A1* | 10/2013 | Balko | G06Q 10/06 |
| | | | 707/E17.014 |
| 2014/0372466 A1* | 12/2014 | Wong | G06F 16/2423 |
| | | | 707/760 |
| 2015/0039588 A1* | 2/2015 | Baeumges | G06F 16/2457 |
| | | | 707/718 |
| 2019/0114181 A1* | 4/2019 | Goyal | G06F 9/44505 |

* cited by examiner

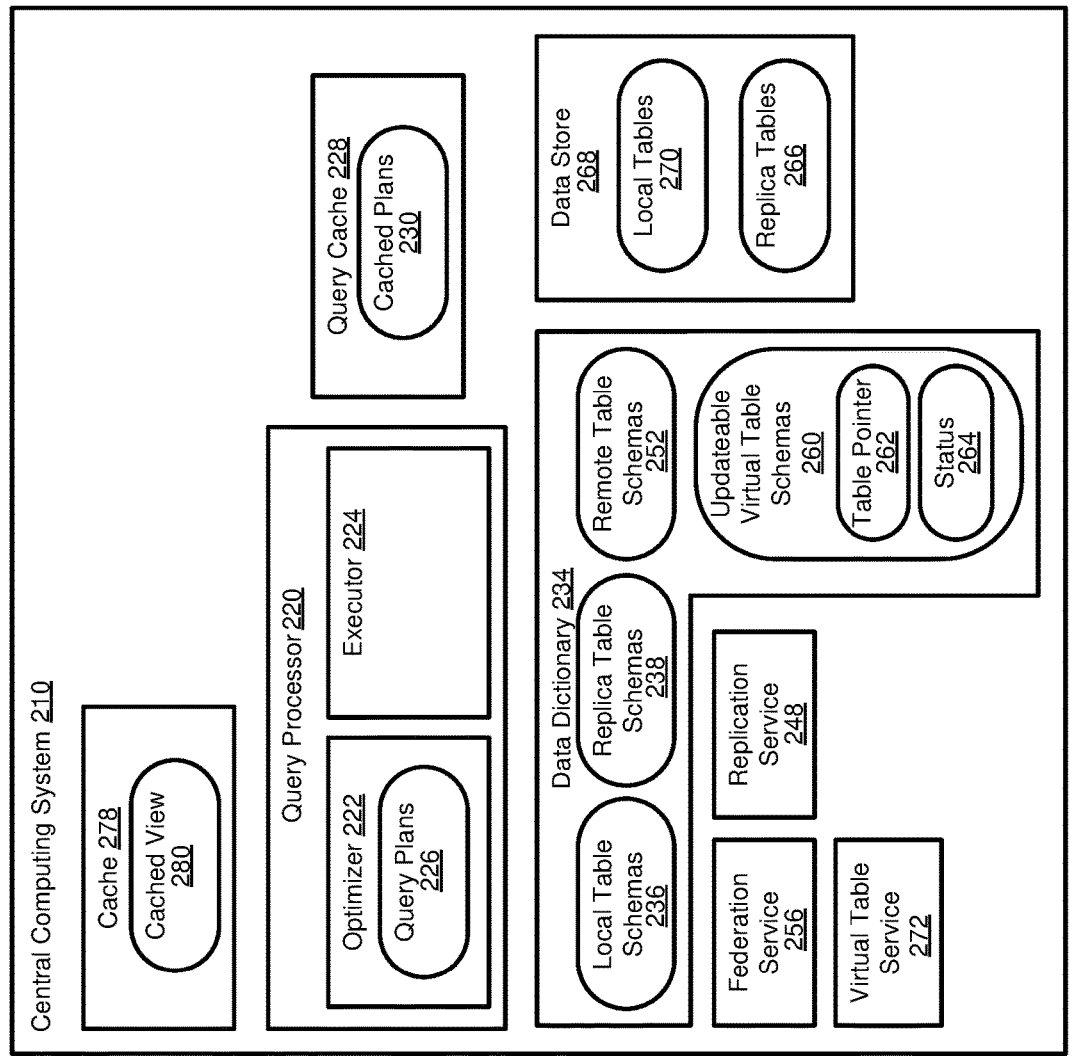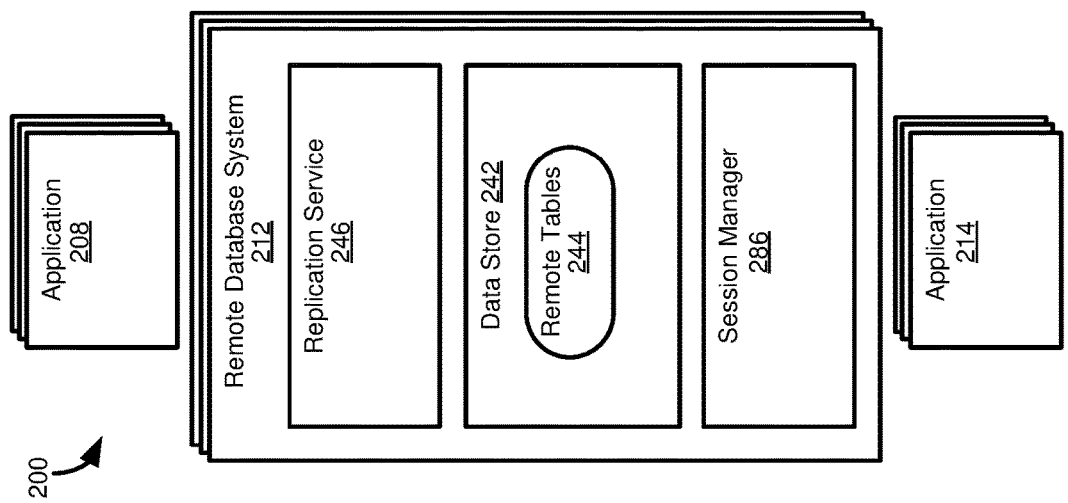
FIG. 2

```
318  CREATE FUNCTION SCALE (val INT)   ─310    ─314
     RETURNS TABLE (a INT, b INT)
     LANGUAGE SQLSCRIPT AS
     BEGIN   ─330              ─338                         ─300
       RETURN SELECT a, :val * b AS b FROM mytab;
322{                 ─334   ─340                 ─336
     END;

362  364   366  368   370    372  374   376
CREATE VIRTUAL FUNCTION V_SCALE AT REMOTE_SOURCE.DB.SCHEMA.SCALE;   ─360

─382  ─380
SELECT * FROM V_SCALE('02');
              ─366
```

FIG. 3

414 → 416 418 420 422
CREATE VIEW param_view (c1, c2) 410
424 → 426 434 432
(IN p1 int, IN p2 NVARCHAR(30))
430 428 436 440 438
AS SELECT * FROM base_tab
442 WHERE a=:p1 AND b=:p2;
430 432

450
452 454 456 458
CREATE VIRTUAL TABLE v_param_view AT remote_source.db.schema.param_view;

470
474 420 478
SELECT * FROM PARAM_VIEW (5, 'Korea');

FIG. 4

| 704 → | 700 ← |
|---|---|
| SCHEMA_NAME 710a | NVARCHAR(256) |
| VPDO_NAME 710b | NVARCHAR(256) |
| VPDO_OID 710c | BIGINT |
| PARAMETER_OID 710d | BIGINT |
| PARAMETER_NAME 710e | NVARCHAR(256) |
| DATA_TYPE_ID 710f | INTEGER |
| LENGTH 710g | INTEGER |
| SCALE 710h | INTEGER |
| POSITION 710i | INTEGER |
| TABLE_TYPE_SCHEMA 710j | NVARCHAR(256) |
| TABLE_TYPE_NAME 710k | NVARCHAR(256) |
| PARAMETER_TYPE 710l | NVARCHAR(7) |
| HAS_DEFAULT_VALUE 710m | BOOL |
| DEFAULT_VALUE 710n | NVARCHAR(256) |
| IS_NULLABLE 710o | BOOL |

| 754 → 750 | 756 ← |
|---|---|
| SCHEMA_NAME 758a | NVARCHAR(256) |
| VPDO_NAME 758b | NVARCHAR(256) |
| VPDOID 758c | BIGINT |
| PVDO_TYPE 758d | NVARCHAR(14) |
| PVDO_USAGE_TYPE 758e | NVARCHAR(9) |
| REMOTE_SOURCE_NAME 758f | NVARCHAR(256) |
| ADAPTER_NAME 758g | NVARCHAR(256) |
| REMOTE_SCHEMA_NAME 758h | NVARCHAR(256) |
| REMOTE_PDO_NAME 758i | NVARCHAR(256) |
| HAS_PARAMETERS 758j | BOOL |
| INPUT_PARAMETER_COUNT 758k | INTEGER |
| RETURN_VALUE_COUNT 758l | INTEGER |
| OWNER_NAME 758m | NVARCHAR(256) |
| CREATE_TIME 758n | TIMESTAMP |

FIG. 7

VIRTUAL ACCESS TO PARAMETERIZED DATA OBJECTS

FIELD

The present disclosure generally relates to parameterized data objects. Particular implementations relate to providing access to remote parameterized data objects using a local, virtual representation of the remote parameterized data object.

BACKGROUND

It is increasingly common for enterprises to have data stored in a variety of systems, including in one or more local systems and in one or more cloud-based systems. The systems can be of different types—such as storing data in different formats (e.g., a relational database versus a database that stores JAVA documents) or storing data using different database management systems (e.g., using software and/or hardware provided by different vendors). Even where data is stored in the same format and using software of the same vendor, differences can exist in what data is stored at a particular location and the schema used to store it.

In order to help address these issues, database federation techniques have been used. In a federated database environment, requests for database operations, such as queries, can specify sources at a local database system or at a "remote" database accessed using data federation. In some cases, both local and remote data sources can be specified in the same query, such as having a query that retrieves data from a local database table and data from a data source of a remote, federated database system.

Database federation is typically used for "static" database objects, such as database tables or database views, or similar constructs. Issues can arise in providing remote access to other types of data objects, given that these data objects have information in a schema that is not typically accessible to a local system. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for providing federated data access to parameterized data objects. At a local system, a virtual parameterized data object is created. A remote computing system is contacted to obtain parameters used by a parameterized data object of the remote computing system to which the virtual parameterized data object corresponds. Parameter information received from the remote system is stored in a definition of the virtual parameterized data object at the local system. When a request for a database operation involving the virtual parameterized data object is received, the parameter information can be used to determine whether the request is correctly formed, or can be used in preparing a request to be sent to the remote system to be performed using the parameterized data object to obtain information specified in the request for a database operation.

In one aspect, the present disclosure provides a process for executing a request for one or more database operations, where an operation specifies a virtual parameterized data object. At a database system, a first request for one or more database operations is received. At least a first database operation of the one or more database operations is specified for a virtual parameterized data object, the virtual parameterized data object being mapped to a parameterized data object on a remote computing system accessed by the database system using data federation. Mapping information for the virtual parameterized data object is retrieved.

Based at least in part on the mapping information, a second request for one or more database operations is generated. The second request includes at least a second database operation corresponding to the at least a first data operation. The second request is sent to the remote computing system. Execution results are received from the remote computing system. At least a portion of the execution results, or data derived at least in part therefrom, is sent in response to the first request.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 is a diagram depicting a computing environment in which a database system can access data in a remote computing system using data federation, including virtual tables mapped to remote tables of the remote computing system.

FIG. 3 is a diagram illustrating example code for defining a parameterized user-defined table function, for creating a virtual user-defined table function that is mapped to the parameterized user-defined table function, and for accessing data of the parameterized user-defined table function using the virtual user-defined table function.

FIG. 4 is a diagram illustrating example code for defining a parameterized view, for creating a virtual parameterized view that is mapped to the parameterized view, and for accessing data of the parameterized view using the virtual parameterized view.

FIG. 7 illustrates example ways of storing information for parameters of a virtual parameterized data object and of information mapping the virtual parameterized data object to a parameterized data object.

DETAILED DESCRIPTION

Example 1—Overview

Figure 1:
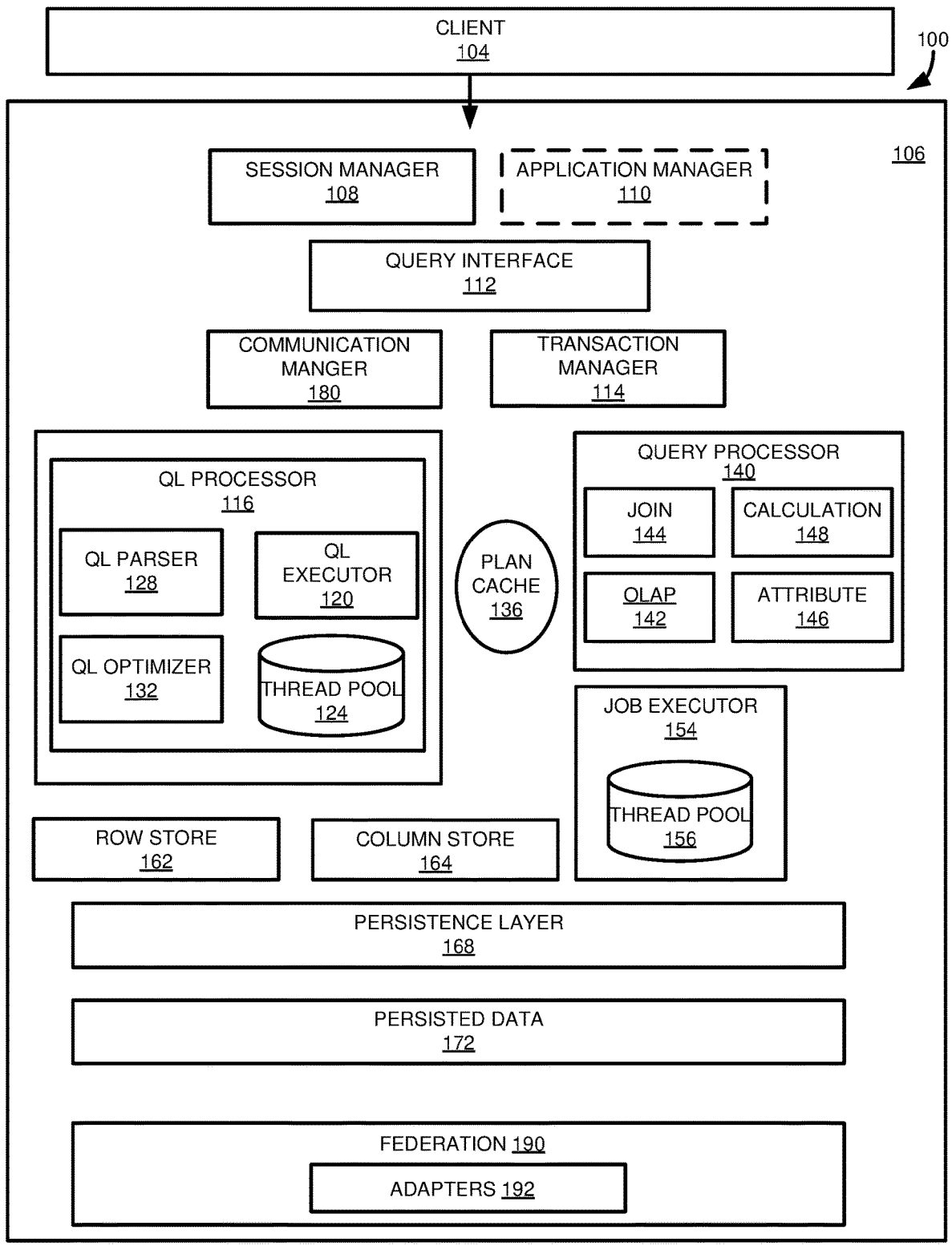
FIG. 1 is a diagram depicting an example database system which can be used in implementing aspects of disclosed technologies.

It is increasingly common for enterprises to have data stored in a variety of systems, including in one or more local systems and in one or more cloud-based systems. The systems can be of different types—such as storing data in different formats (e.g., a relational database versus a database that stores JAVA documents) or storing data using different database management systems (e.g., using software and/or hardware provided by different vendors). Even where data is stored in the same format and using software of the same vendor, differences can exist in what data is stored at a particular location and the schema used to store it.

In order to help address these issues, database federation techniques have been used. In a federated database environment, requests for database operations, such as queries, can specify sources at a local database system or at a "remote" database accessed using data federation. In some cases, both local and remote data sources can be specified in the same query, such as having a query that retrieves data from a local database table and data from a data source of a remote, federated database system.

Database federation is typically used for "static" database objects, such as database tables or database views, or similar constructs. Issues can arise in providing remote access to other types of data objects, given that these data objects have information in a schema that is not typically accessible to a local system. Accordingly, room for improvement exists.

One particular class or category of data objects that can be difficult to access via federation is parameterized data objects. The use of a parametrized data object typically requires parameters that are provided by a client when a request involving the data object is made (unless default values are provided or null values are accepted). There parameters are passed to a definition of the data object and then data can be processed and returned in a response to a request.

The present disclosure describes two types of parameterized data objects—user-defined table functions and parameterized views. However, the disclosed techniques can be applied to other types of parameterized data objects in an analogous manner.

In the field of computer science, functions are units of code that typically accept one or more arguments or parameters, perform processing, and then return a result. In the database field, table functions also accept one or more parameters. The result of a table function is a table, where the results are determined at least in part on a parameter value, or parameter values, that are provided when the table function is called.

Parameterized views are similar to table functions, in that they contain a definition that can be used to retrieve data, but the definition depends on one or more parameter values that are supplied when the view is called/queried. As opposed to a table function, a parameterized view need not return results in the form of a table. Rather, results can be provided in the form of rows, a set of rows, or as discrete values.

Although parameterized views and user-defined table functions can accept parameter values, in at least some cases the views and functions are usable even if no parameters are supplied. For example, default parameter values can be provided. Or, code implementing a user-defined table function or a parameterized view can supply values for any parameters where values are not supplied when the user-defined table function or parameterized view is called.

Disclosed techniques provide for the retrieval of metadata for a remote, federated data object when a "virtual" data object is created at a local system, where the virtual data object is referenced by requests for database operations sent to the local system that access data stored at the federated system in the remote object. The metadata includes parameters that are associated with the remote data object. Information about the parameters used by the remote data object is stored on the local database system in association with the virtual data object. The parameter information can be used when a client submits a request to the local database system that accesses a virtual data object. In particular, the parameter information can be used in formatting a request to be sent to the federated system. The parameter information can be used for other purposes, such as checking that a request from a client is properly formed or formatted, for example analyzing the request to see whether it includes the correct number of parameters and that the supplied values are of the correct type. The parameter information, as well as other information in the virtual data object, can be accessed by clients to determine properties of the virtual data object and the remote data object to which it is mapped, such as to assist clients in formulating requests for database operations involving the virtual data object/remote data object.

Example 2 describes an example database system that can be used in implementing disclosed technologies. The database system can be an example of either a local database system or a federated database system that is accessed by the local system. Example 3 provides an example of a virtual table, where the virtual table includes a logical pointer that can be updated to point to different locations, including a location in a federated data source or in a local data source (including a local table, or a table maintained in a cache). Although, it should be appreciated that a virtual table can be implemented in a different manner, including in a way that is "statically" mapped to a particular federated data source. Examples 4-8 more specifically describe disclosed techniques for the use of virtual parameterized data objects that are mapped to remote parameterized data objects.

An advantage of disclosed technologies is that they can allow for more data to be accessed through data federation. Accessing data via federation can be beneficial, as it can avoid the use of computing resources that might be needed in order to replicate data from a remote data source or use with another system, including network and storage resources.

Example 2—Example Database Architecture

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers.

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a parameterized data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at remote systems. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Example 3—Example Virtual Tables, Including with Updatable Logical Pointers

FIG. 2 illustrates a computing environment 200 in which disclosed embodiments can be implemented. The basic computing environment 200 of FIG. 2 includes a number of features that can be common to different embodiments of the disclosed technologies, including one or more applications 208 that can access a central computing system 210, which can be a cloud computing system. The central computing system 210 is shown as a monolithic/unitary system, but it should be appreciated that, particularly in a cloud environment, the central computing system can include a number of computing systems that function together as a single system. For example, the central computing system 210 can be implemented as a plurality of "nodes," including an anchor node and zero or more non-anchor nodes. A central computing system 210 can also be a more typical "distributed" database system, which includes a master node and one or more worker nodes.

The central computing system 210 can act as such by providing access to data stored in one or more remote database systems 212. In turn, the remote database systems 212 can be accessed by one or more applications 214. In some cases, an application 214 can also be an application 208. That is, some applications may only (directly) access data in the central computing system 210, some applications may only access data in a remote database system 212, and other applications may access data in both the central computing system and in a remote database system.

The central computing system 210 can include a query processor 220. The query processor 220 can include multiple components, including a query optimizer 222 and a query executor 224. The query optimizer 222 can be responsible for determining a query execution plan 226 for a query to be executed using the central computing system 210. The query plan 226 generated by the query optimizer 222 can include both a logical plan indicating, for example, an order of operations to be executed in the query (e.g., joins, projections) and a physical plan for implementing such operations. Once developed by the query optimizer 222, a query plan 226 can be executed by the query executor 224. Query plans 226 can be stored in a query plan cache 228 as cached query plans 230. When a query is resubmitted for execution, the query processor 220 can determine whether a cached query plan 230 exists for the query. If so, the cached query plan 230 can be executed by the query executor 224. If not, a query plan 226 is generated by the query optimizer 222. In some cases, cached query plans 230 can be invalidated, such as if changes are made to a database schema, or at least components of a database schema (e.g., tables or views) that are used by the query.

A data dictionary 234 can maintain one or more database schemas for the central computing system 210. In some cases, the central computing system 210 can implement a multitenant environment, and different tenants may have different database schemas. In at least some cases, at least some database schema elements can be shared by multiple database schemas.

The data dictionary 234 can include definitions (or schemas) for different types of database objects, such as schemas for tables or views. Although the following discussion references tables for ease of explanation, it should be appreciated that the discussion can apply to other types of database objects, particularly database objects that are associated with retrievable data, such as materialized views. A table schema can include information such as the name of the table, the number of attributes (or columns or fields) in the table, the names of the attributes, the data types of the attributes, an order in which the attributes should be displayed, primary key values, foreign keys, associations to other database objects, partition information, or replication information.

Table schemas maintained by the data dictionary 234 can include local table schemas 236, which can represent tables that are primarily maintained on the central computing system 210. The data dictionary 234 can include replica table schemas 238, which can represent tables where at least a portion of the table data is stored in the central computing system 210 (or which is primarily managed by a database management system of the central computing system, even if stored other than on the central computing system, such as being stored in a data lake or in another cloud service). Tables having data associated with replica tables schemas 238 typically will periodically have their data updated from a source table, such as a remote table 244 of a data store 242 of a remote database system 212.

Replication can be accomplished using one or both of a replication service 246 of the remote database system 212 or a replication service 248 of the central computing system 210. In particular examples, the replication service can be the Smart Data Integration (SDI) service, SAP Landscape Transformation Replication Server, SAP Data Services, SAP Replication Server, SAP Event Stream Processor, or an SAP HANA Direct Extractor Connection, all of SAP SE, of Walldorf, Germany.

In some cases, data in a remote database system 212 can be accessed by the central computing system 210 without replicating data from the remote database system, such as using federation techniques. The data dictionary 234 can store virtual table schemas 252 for virtual tables that are mapped to remote tables, such as a remote table 244 of a remote database system 212. Data in the remote table 244 can be accessed using a federation service 256, such as using the Smart Data Access protocol of SAP SE, of Walldorf, Germany. The federation service 256 can be responsible for converting query operations into a format that can be processed by the appropriate remote database system 212, sending the query operations to the remote database system, receiving query results, and providing the query results to the query executor 224.

The data dictionary 234 can include updatable virtual table schemas 260 that have updatable logical pointers 262. The updated virtual table schemas 260 can optionally be associated with status information 264. The table pointer 262 can be a logical pointer used to identify what table should be accessed for data of the corresponding virtual table schema 260. For example, depending on the state of the table pointer 262, the table pointer can point to the remote table 244 of a remote database system 212 or a replica table 266 (which can be generated from the remote table 244) located in a data store 268 of the central computing system 210. The data store 268 can also store data for local tables 270, which can be defined by the local table schemas 236.

The table pointer 262 can be changed between the remote table 244 and the replica table 266. In some cases, a user can manually change the table pointed to by the table pointer 262. In other cases, the table pointer 262 can be automatically changed, such as in response to the detection of defined conditions.

The status information 264 can include an indicator identifying a virtual table schema 260 as being associated with a remote table 244 or a replica table 266. The status information 264 can also include information about the replication status of a replica table 266. For example, once a request is made to change the table pointer 262 to point to a replica table 266, it may take time before the replica table is ready for use. The status information 264 can include whether a replication process has been started, has been completed, or a progress status of generating the replica table 266.

Changes to updateable virtual table schemas 260 and managing replica tables 266 associated with virtual table schemas can be managed by a virtual table service 272. Although shown as a separate component of the central computing system 210, the virtual table service 272 can be incorporated into other components of the central computing system 210, such as the query processor 220 or the data dictionary 234.

When a query is executed, the query is processed by the query processor 220, including executing the query using the query executor 224 to obtain data from one or both of the data store 242 of the remote database system 212 or the data store 268 of the central computing system 210. Query results can be returned to the application 208. Query results can also be cached, such as in a cache 278 of the central computing system 210. The cached results can be represented as cached views 280 (e.g., materialized query results).

The applications 214 can access data in the remote database system 212, such as through a session manager 286. The applications 214 can modify the remote tables 244. When a table pointer 262 of an updateable virtual table schema 260 references a remote table 244, changes made by the applications 214 are reflected in the remote table. When a table pointer 262 references a replica table 266, changes made by the applications 214 can be reflected in the replica table using the replication service 246 or the replication service 248.

Example 4—Example Definition of User-Defined Table Function, Creation of Mapping Thereto, and Accessing of User-Defined Table Function Using Virtual Parameterized Data Object FIG. 3 illustrates a definition 300 for a user-defined table function. The user-defined table function has a name or identifier 310, and the syntax of the user-defined table function definition 300 indicates that the user-defined table function has a single input parameter 314. Note that the input parameter 314 has both a name/identifier ("val") and a type ("INT," representing an integer datatype). Line 318 of the definition 300 indicates that the function provides a table as the return type, and the syntax of line 318 indicates that the table has two columns having names/identifiers "a" and "b," and which each are of type "INT" (integer).

Lines 322 define operations performed by the user-defined table function. The operations are SQL operations, in the form of a select statement 330 that selects an attribute "a" (334) from a table "mytab" (336) specified in a FROM operator (338). Column "b" of the return table is defined as the product of a column "b" (340) of the table 336 multiplied by the value of the input parameter 314.

For the purposes of the present disclosure, the definition 300 is typically entered/executed/maintained at a remote/federated database system. That is, a local system can also include user-defined table functions, but disclosed techniques involve accessing user-defined table functions (or other parameterized data objects) at remote systems/using data federation.

Statement 360 provides an example of how the user-defined table function according to the definition 300 can be "registered" at a local computing system as a virtual data object (in this case a virtual user-defined table function). The statement 360 includes a "create" operator 362 that is followed by the keyword "virtual" 364, which indicates that the data object to be created is a virtual data object that is accessed via data federation at a remote/federated database system. The statement 360 also provides an identifier 366 for the type of data object being created (virtually), in this case indicating that the data object is a "function." The statement 360 then provides a name/identifier 368 for the remote data object to be used by the local system, and then a "path" to the remote data object to which the local, virtual data object will be "mapped," in the form of an identifier 370 of the remote system, an identifier 372 of a database of the remote system, an identifier 374 of a schema of the database of the remote system, and an identifier 376 of the remote data object.

That the remote data object is a user-defined table function can be determined or indicated in a variety of ways. In one implementation, identifier 366 for the type of data object can indicate that the remote data object is a user-defined table function. In other implementations, the identifier 366 can indicate a general type of data object (a function, generally), and a more specific type of data object (such as whether the function is a user-defined function that does not return a table, is a user-defined function that returns a table, or is a "built in" function), can be determined when information about the remote data object is retrieved from the remote computing system.

Statement 380 provides an example of how a virtual user-defined table function can be accessed by a client. The statement 380 can be in a query language, such as SQL or a dialect thereof, and identifies that all data should be retrieved using the remote function identified by the identifier 366 and using a value 382 for the parameter 314. So, when the virtual user-defined table function is called at the local system, parameters provided in the call will be provided to the remote system, used in the select statement 330, and appropriate results returned by the remote system to the local system and either further processed or returned to a client.

Example 5—Example Definition of a Parametrized View, Creation of a Mapping Thereto, and Accessing of the Parameterized View Using a User Virtual Parameterized View FIG. 4 illustrates code for implementing a parameterized view in a remote system, mapping a virtual data object to the parameterized view, and calling the virtual data object representing the parameterized view.

Code 410 creates a parameterized view at a remote system. Line 414 includes the "CREATE" command 416, a type identifier 418 that indicates the data object being created is a view, an identifier/name 420 of the view 410, and identifiers 422 of two parameters included in the view. Line 424 includes two instances 426, 428 of the keyword "IN" which declares/provides details regarding the two input parameters, having respective names/identifiers 430, 432 and respective datatypes 434, 436 (integer and a character array of maximum length 30). The code 410 further includes a view definition 438, where information is selected from another data object 440 (base_tab). A filter/WHERE 442 clause of the view definition 438 includes the parameters 422 for respective attributes of the data object 440. Thus, the use of the parameters makes the view 410 "dynamic" in that the filter conditions can be changed, by using different values for the parameters 422, each time the view is accessed.

Code 450 creates a virtual data object in the local system that is mapped to the parameterized view created by the code 410. In particular, the code 450 includes the "CREATE" command 452 and a type identifier 454 that indicates that the virtual data object being created is a virtual table (where, in this case a virtual view is considered a type of virtual table). In some cases, a type of virtual data object can be determined from the code 450, while in other cases the code specifies a remote data object and communications with a remote system provide more information about a type of the referenced data object, which is then used to create the virtual data object with the appropriate type.

Code 450 provides a name/identifier 456 for the virtual table at the local system, and provides a path 458 for the corresponding parameterized view at the remote system, including the name/identifier 422 of the view at the remote system.

Code 470 is an example of how the parameterized view 410 can be called by a client using the virtual parameterized view created using the code 450. A SELECT operation 474 specifies that all values (indicated using the wildcard value "*") should be selected from the view, indicated by the identifier 420. The SELECT operation 474 also provides values 478 for the parameters 422, which will be supplied to the filter clause 442. So, when the virtual parameterized view is called at the local system, parameters provided in the call will be provided to the remote system, used in the filter clause 442, and appropriate results returned by the remote system to the local system and either further processed or returned to a client.

Example 6—Example Routing of Database Operations Involving a Remote Join

Figure 5:
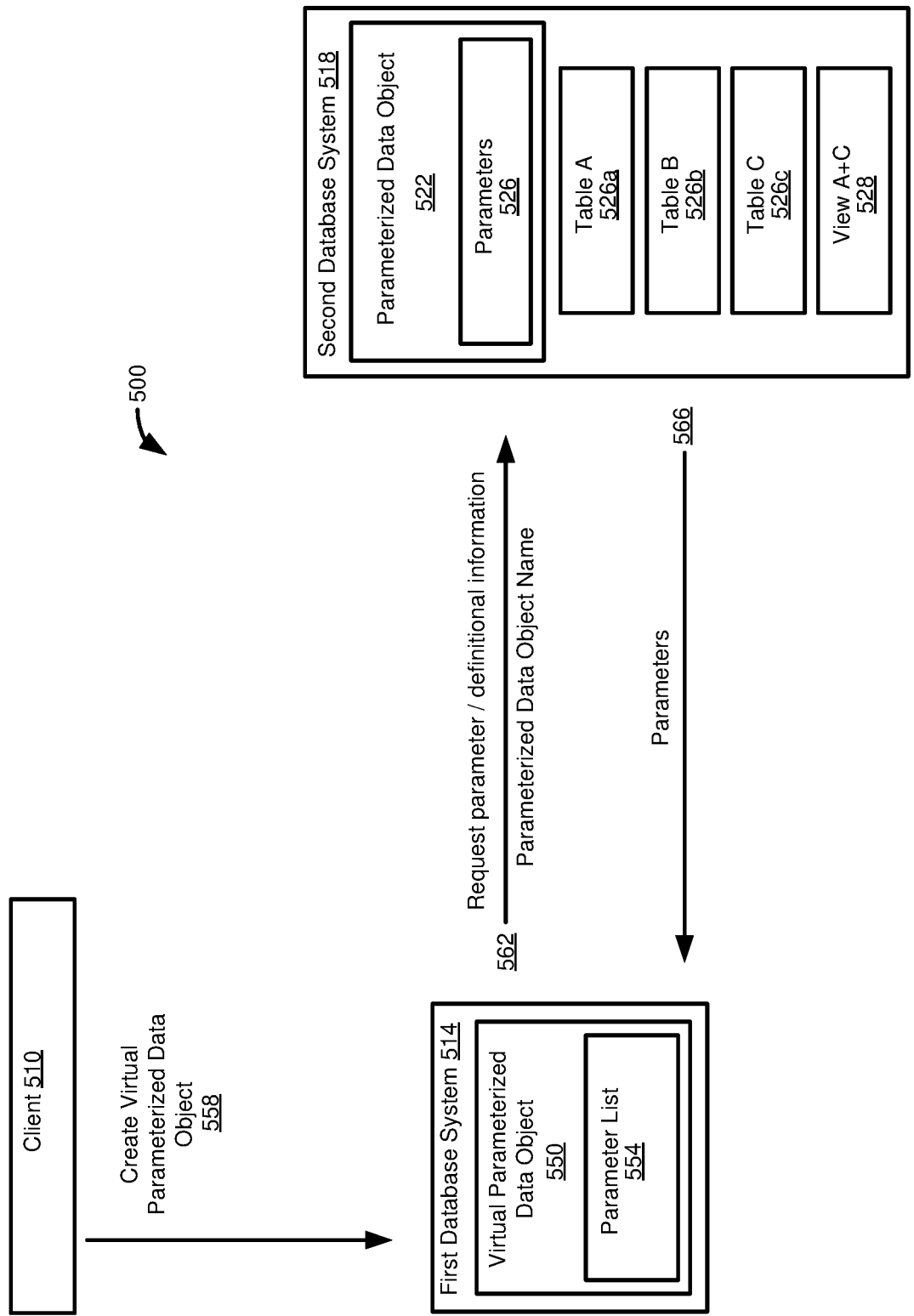
FIG. 5 is a diagram illustrating a client system, a first database system, and a second database system, including operations for creating a virtual parameterized data object on the first database system that references a parameterized data object on the second database system.

FIG. 5 is a diagram of a computing environment 500 illustrating how a virtual user-defined object, such as a virtual user-defined table function or a virtual parameterized view, can be created. The computing environment 500 includes a client 510 that communicates with a first database system 514, and where the first database system communicates with a second database system 518. The first database system 514 can be considered a "local" database system, in that it receives and processes requests from the client 510.

The second database system 518 includes a parameterized data object 522, such as a user-defined table function or a parameterized view, that includes one or more parameters 526. The parameterized data object 522 can be created in any suitable manner using commands that are appropriate for the second database system 518. In a particular example, commands having the general format of the code 300 of FIG. 3, or the code 410 of FIG. 4 can be used. The parameterized data object 522 can access other data objects of the second database system 518, such as tables 526a, 526b, 526c, or a view 528, where the view is defined with respect to tables 526a, 526c.

The first computing system 514 includes a virtual parameterized data object 550 that is "mapped" to the parameterized data object 522, where typically the virtual parameterized data object and the parameterized data object are of the same type (that is, both are, or represent, user-defined table functions or parameterized views). The mapping can be created using a command analogous to code 360 or code 450. The virtual parameterized data object 550 includes information about the parametrized data object 522, including a list 554 of parameters used by the parameterized data object.

For creation, the client 510 sends a request 558 to create the virtual parameterized data object 550. The request 558 includes information that is at least analogous to the information in the code 360 or the code 450, including a name to be used for the virtual parameterized data object 550 and a name and path for the parameterized data object 522 at the second database system 518.

In response to the request 558, the first database system 514 sends one or more requests 562 to the second database system 518. In one implementation, the first database system 514 sends a first request to the second database system 518 to confirm that the parameterized data object 522 exists at the second database system. If a response 566 from the second database system 518 indicates that the specified parameterized data object exists, the first database system 514 sends a second request to the second database system, requesting information about the parameterized data object 522.

In particular, the request is to obtain parameters 526 used with the parameterized data object 522, information about which can be stored by the first database system 514 in association with the virtual parameterized data object 550, such as in the list of parameters 554, and this information can be provided in the response 566. The parameter information can include an identifier (name) of the parameter and a datatype of the parameter. Information about the parameters 526 can also include whether the parameters are associated with a default value/whether values are required for a particular parameter.

When the client 510 sends a request to access the virtual parameterized data object 550, the first database system 514 can use definitional information for the virtual parameterized data object, such as the list of parameters 554, to confirm that the request is property formulated—such as providing values for any required parameters, and that the provided values are of the appropriate datatype. In another implementation, rather than having two requests 562 and two responses 566, a single request can be used to both confirm that the parameterized data object 522 exists and to obtain information about it to include in the virtual parameterized data object 550, where a response indicates that the parameterized data object 522 does not exist, or provides information about parameters 526 and optionally other definitional information for the parameterized data object if the parameterized data object 522 does exist.

Figure 6:
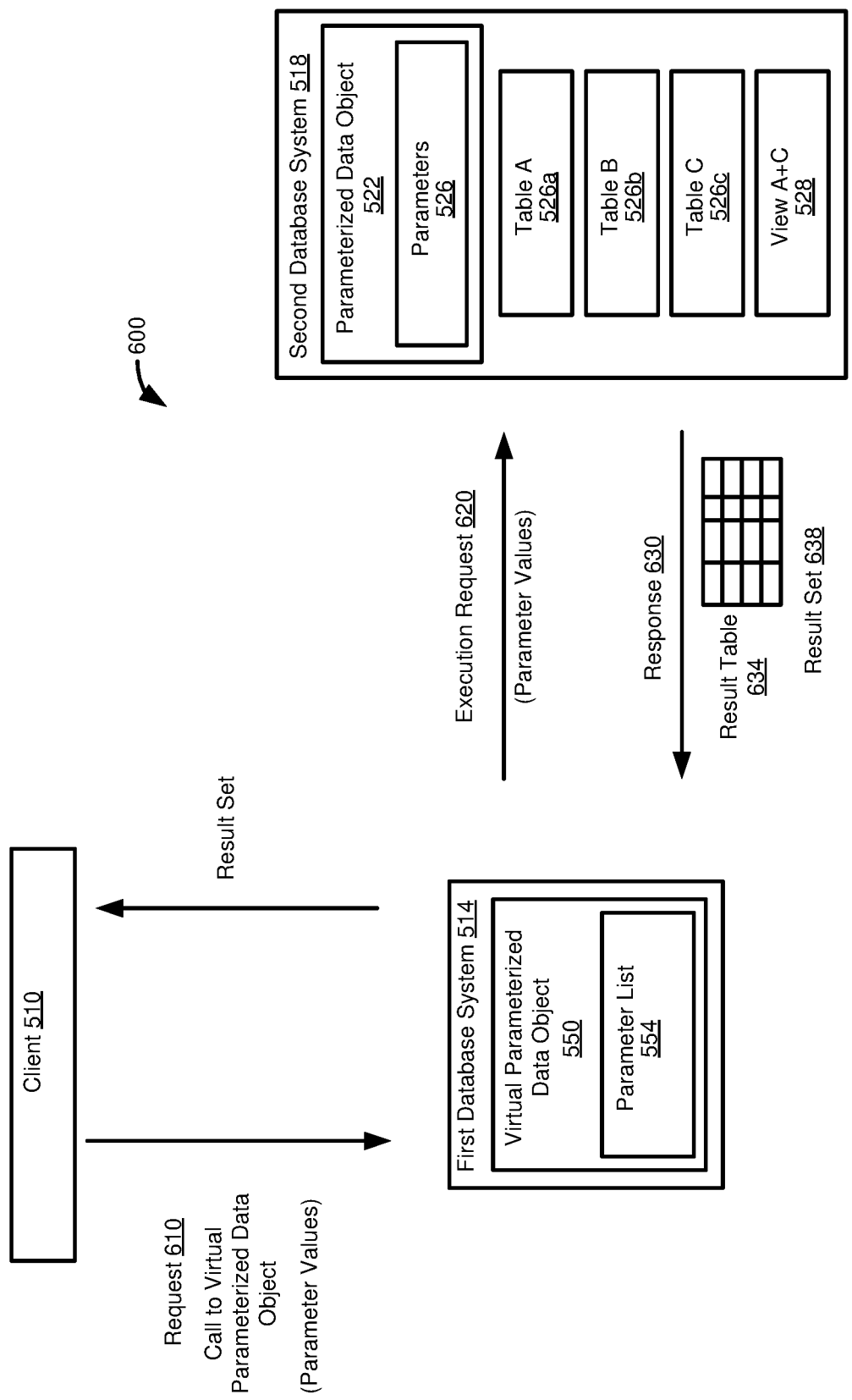
FIG. 6 is a diagram illustrating a client system, a first database system, and a second database system, including operations for using a virtual parameterized data object on the first database system to access data from a parameterized data object on the second database system.

A procedure for processing a client request is further illustrated with respect to FIG. 6. FIG. 6 includes components of FIG. 5, which are labelled as in FIG. 5. The client 510 sends a request 610 to the first database system 514 that includes a call to the virtual parameterized data object 550, including the name of the virtual parameterized data object and one or more parameter values for parameters in the list 554. The first database system 514 processes the request 610, such as using database components that can be analogous to those described with respect to FIG. 1.

As part of processing the request 610, the first database system 514 can analyze the request to confirm that the referenced virtual parameterized data object 550 exists, such as in a data dictionary or information schema, and checking to see if values are provided for all required parameters, and that supplied parameters have the appropriate datatype. If the request 610 specifies a virtual parameterized data object 550 that does not exist in the first database system 514, the first database system can return an error to the client 510. Otherwise, the first database system 514 sends a request 620 to the second database system 518 to cause the execution of the request operations using the parameterized data object 522, with the values for the parameters 526 provided in the client request 610.

In some cases, the request 610 provided by the client 510 can be directly sent to the second database system 518 after being received and processed by the first database system 514. This is, the request 610 may include at least some commands that are executable by the second database system 518 without needing to be reformatted by the first database system 514. In other cases, the first database system 514 can process or reformat the client request 610 for processing by the second database system 518. In particular, if the first and second database systems 514, 518 use common syntax, and typically if the virtual parameterized data object 550 and the parameterized data object 522 have the same name, then it may be possible to simply transmit the relevant portion of the request 610 to the second database system. However, often at least the names of the virtual parameterized data object 550 and the parameterized data object 522 will be different, and so in that case the first database system 510 can reformat the request 610 to use the name of the parameterized data object 522. However, in other cases the first and second database systems 514, 518 may be more operationally different, including where requests to access parameterized data objects differ in their syntax. In such case, the first database system 514 can store a template for accessing parameterized data objects 522 at the second database system 518, and can populate the template with values from the request 610. Or, the first database system 514 can otherwise include logic to translate the request 610 into a format that is executable by the second database system 518.

The second database system 518 executes the request 620, including using parameter values supplied in the request 610. Execution of the request 620 can use components analogous to those described in conjunction with FIG. 1. In the case where the parameterized data object 522 is a user-defined table function, the return type is a table, and a response 630 sent by the second database system 518 to the first database system 514 in response to the request 620 includes a results table 634. The results table 634 can be generated by accessing one or more database objects 526a-526c, 528 of the second computing system 518.

In the case where the parameterized data object 522 is a parameterized view, the response can be a result set 638 that includes one or more rows, or a discrete value, depending on the nature of the view and the request 620. The result set 638 can be generated by accessing one or more database objects 526a-526c, 528 of the second computing system 518.

The first database system 514 can then send execution results associated with the virtual parameterized data object 550 to the client 510, where the execution results can be as provided by the second database system 518, or where the execution results can be results that are obtained after further processing of the results from the second database system 518, including results that are derived at least in part from executing the parametrized data object 522, but which may not be identical to such results, or which may be a proper subset of such results.

Example 6—Example Storage of Information Regarding Virtual Parameterized Data Objects FIG. 7 illustrates how data regarding virtual parameterized data objects can be stored, such as on a local computing system that processes requests involving virtual parameterized data objects and in turn sends requests to corresponding parameterized data objects in a remote system via data federation.

Table 700 illustrates information that can be maintained for parameters of a virtual parameterized data object. Various attributes are identified in column 704, while example datatypes for these attributes are provided in column 706. In a particular example, the information in the table 700 itself defines a table, where the columns of that table correspond to the attribute/rows of the table 700. The rows of a table having a schema defined by the table 700 can have rows that provide particular values for the attributes 704, for particular virtual parameterized data objects registered in the computing system. As has been described, the local computing system can make a call to confirm that a particular parameterized data object exists in the remote data system, and to obtain information, such as parameter information, for the parameterized data object, and that information can be stored in a table defined according to the schema of the table 700.

The table 700 includes attributes that describe the virtual parameterized data object with which a parameter is associated. In particular, attribute 710a identifies a database schema associated with the virtual parameterized data object, attribute 710b provides a name (such as a name that might be used in a client query) of the virtual parameterized data object, and another identifier, such as a numeric identifier (for example, a UUID), for the virtual parameterized data object can be provided by attribute 710c.

Identifying information can also be provided for particular parameters. For example, it may be desirable to be able to directly reference/locate a particular parameter, which can be accomplished using attribute 710d, which provides an identifier (such as a numeric identifier, which can be a UUID) for the parameter, and attribute 710e, which provides a name for a parameter, such as a name that may be used in a client request for a virtual parameterized data object that includes the parameter.

A variety of attributes can be included to provide information about the parameter, such as an attribute 710f that identifies a datatype for the parameters (such as whether the parameter value is a string, an integer, a Boolean value, etc., which as shown can be indicated using an integer value where specific integer values correspond to specific datatypes), an attribute 710g that specifies the length (such as a maximum length) of a parameter value (such as indicating a maximum length of a character array or string), and an attribute 710h that specifies a scale (identifying the location of a decimal point for numeric values) for the parameter. Methods/functions in computer science typically take parameters in a specific order. The order in which a parameter should be provided in a call to a remote parameterized data object is specified by attribute 710i.

As noted, a particular application of disclosed techniques is for virtual user-defined table functions, where the return type is a table. To help process return results (such as to store results in an appropriate object instance and in an appropriate format for the corresponding object), it can be useful to know a particular schema associated with the table being returned and an identifier of the table, where these values can be provided for attributes 710j and 710k, respectively.

Parameters can have different types, such as whether they serve as input parameters, output parameters, or as both input and output parameters. Information about the function of a parameter can be provided as a value for an attribute 710l. Attribute 710l can also be useful in scenarios where it is desired to make the table 700 more general, such as storing parameter information for parameterized data objects that are local, as well as virtual parametrized data objects that refer to remote parameterized data objects.

In addition, methods or functions can differ in whether a parameter is associated with a default value and whether null values are allowed for a particular parameter. The table 700 can reflect this information, where an attribute 710m indicates whether a default value is specified and an attribute 710n specifies the default value, when a default value is provided. Note that a value in the attribute 710n need not correspond to the parameter datatype specified for the attribute 710f. The value of the attribute 710f can be used to cast the value for the attribute 710n to the correct datatype for the parameter in the call to the remote system. Attribute 710o specifies whether null values are allowed for a given parameter.

Table 750 represents one way of maintaining mapping information between local virtual parameterized data objects and remote parameterized data objects. As has been described, mapping information can be created when a request is made, such as from a client, to create a virtual parameterized data object. As with the table 700, attributes in a column 754 of the table 750 can define a schema for another table that stores values for particular virtual parameterized data objects. Column 756 provides example data-types for the attributes of column 754.

Attributes 758a, 758b, and 758c are analogous to attributes 710a, 710b, 710c of table 700, providing a schema name where a virtual parameterized data object is defined, a name for the virtual parameterized data object, and another identifier for the virtual parameterized data object. Attribute 758d is used to indicate a type of the virtual parameterized data object, which typically corresponds to a type of its corresponding parameterized data object. Examples of values that can be provided for attribute 758d include "TABLE" (for a user-defined table function) and "VIEW" (for a parameterized view). Although the present disclosure has been described with respect to user-defined table functions, disclosed techniques can be used with other types of functions (aggregate functions or window functions, for example). An attribute 758e can be used to store information about a function type. More generally, the attribute 758e can be used to identify a subtype of the parameterized virtual data object indicated by a value for attribute 758d.

Attributes 758f-758i can be used to map a virtual parameterized data object to a parameterized data object. Tables 750 and 700 can be joined so that parameters in a local system can be correlated with a particular parameterized data object in a remote system. In particular, attribute 758f identifies a particular remote data source having the parameterized data object, attribute 758g identifies an adapter that is used to communicate with the remote data source, which can include information such as a network address, an API to be used, or logic to format requests in a manner that can be accepted and processed by the remote data source. For example, logic can include "connectors" as implemented in data federation technologies available from SAP SE, of Walldorf, Germany Attribute 758h identifies a schema of the remote data source that contains the parameterized data object, while attribute 758i provides a name/identifier of the particular parameterized data object in the schema of the remote system.

In some cases, table 750 can store information about remote data objects that are not parameterized. If so, the table 750 can include an attribute 758j that indicates whether a particular virtual data object is parameterized. A number of input parameters for a virtual parameterized data object can be indicated by a value for an attribute 758k, while a number of return values can be provided using attribute 758l.

Information about an "owner" of a virtual parameterized data object can be provided by a value for attribute 758m, which information can be used for purposes such as determining who is allowed to access the object, or who is allowed to delete or update the object. A creation (or modification) time can be provided using attribute 758n.

Example 8—Example Operations Involving Virtual Parameterized Data Objects

Figure 8:
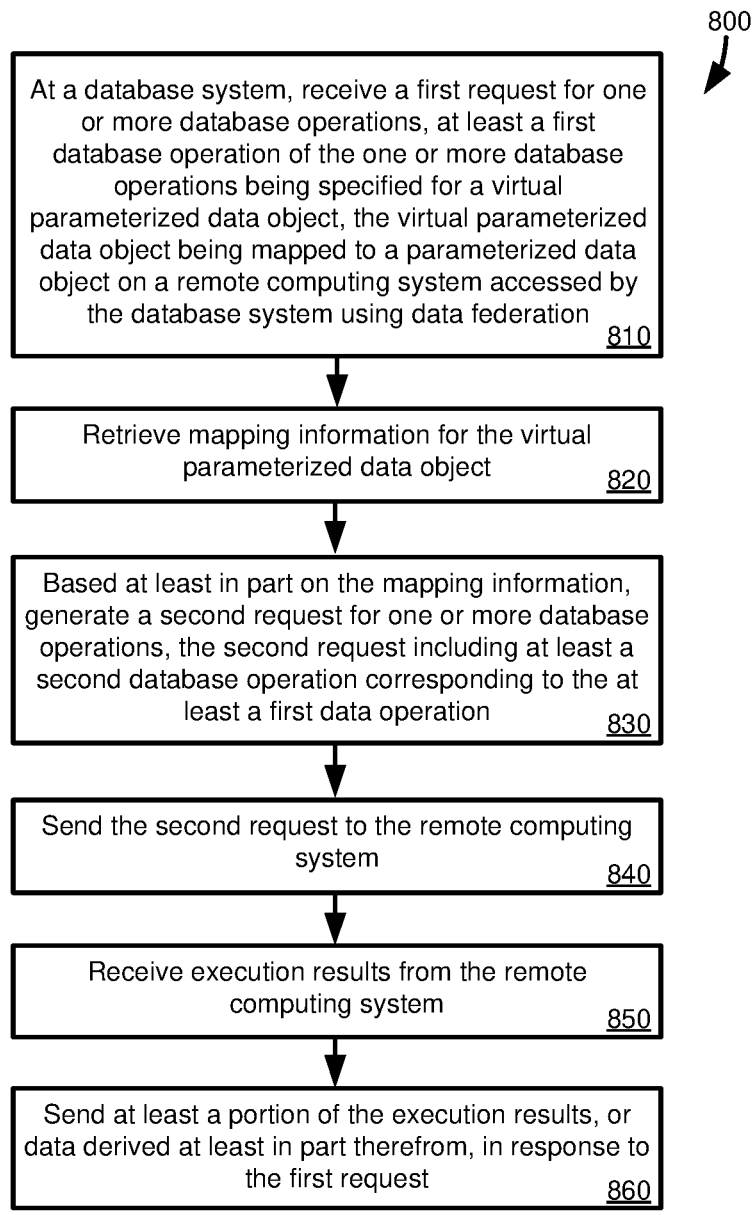
FIG. 8 is a flowchart of a process of executing a request for a database operation using a virtual parametrized data object.

FIG. 8 illustrates a process 800 for executing a request for one or more database operations, where an operation specifies a virtual parameterized data object. The process 800 can be performed in the computing environments 100, 200, 500, or 600 of FIG. 1, 2, 5, or 6.

At a database system, a first request for one or more database operations is received at 810. At least a first database operation of the one or more database operations is specified for a virtual parameterized data object, the virtual parameterized data object being mapped to a parameterized data object on a remote computing system accessed by the database system using data federation. Mapping information for the virtual parameterized data object is retrieved at 820.

At, 830, based at least in part on the mapping information, a second request for one or more database operations is generated. The second request includes at least a second database operation corresponding to the at least a first data operation. The second request is sent to the remote computing system at 840. At 850, execution results are received from the remote computing system. At least a portion of the execution results, or data derived at least in part therefrom, is sent at 860 in response to the first request.

Example 9—Computing Systems

Figure 9:
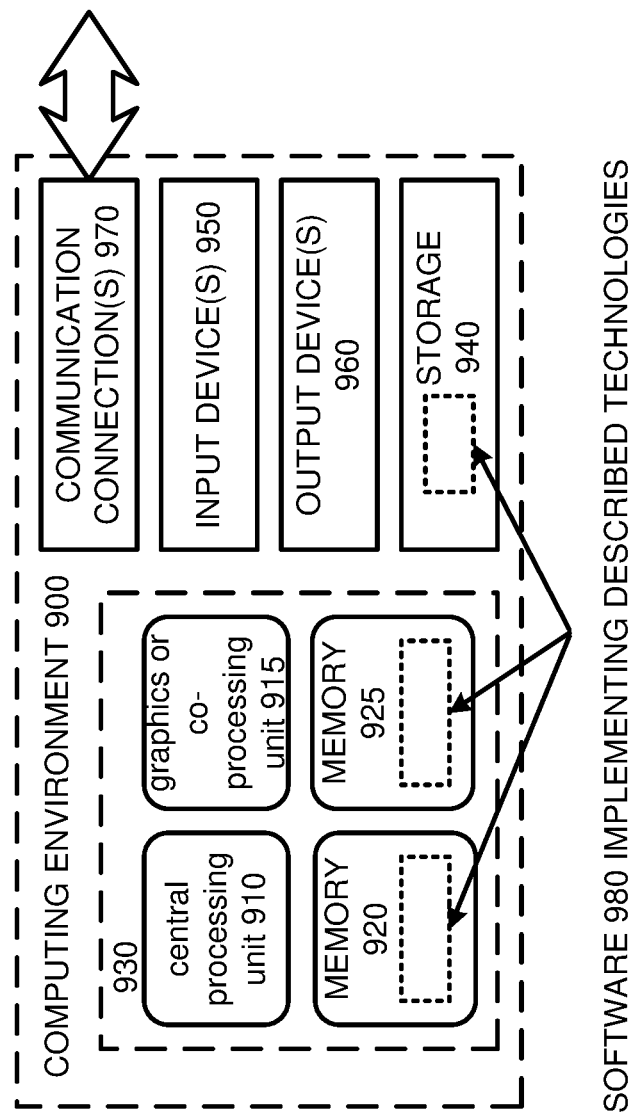
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), nonvolatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900.

The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 10:
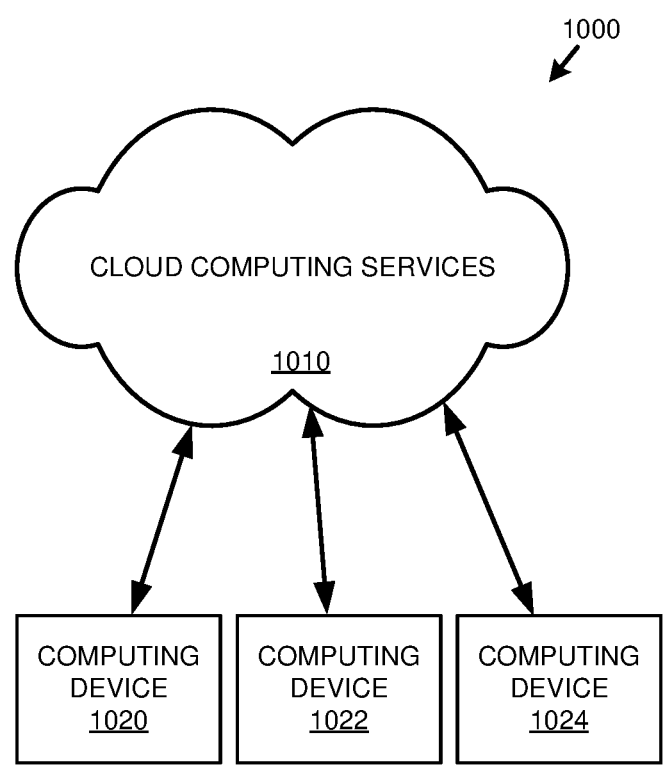
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions, when executed, the computing system performs operations comprising:
      at a database system, receiving a first request for one or more database operations, at least a first database operation of the one or more database operations being specified to be performed on a virtual parameterized database object and comprising one or more parameter values;
      determining that the virtual parameterized data object is defined in the database system;
      retrieving mapping information for the virtual parameterized database object, the mapping information mapping the virtual parameterized database object of the database system to a parameterized database object of a remote computing system, accessed by the database system using data federation, the mapping information comprising a mapping of at least one parameter of the virtual parameterized database object to at least one parameter of the parameterized database object;
      using the mapping information, generating a second request for one or more database operations, the second request comprising at least a second database operation corresponding to the at least a first database operation and at least a portion of the one or more parameter values;
      sending the second request to the remote computing system, where the remote computing system executes the second request using the parameterized database object and the at least a portion of the one or more parameter values to provide execution results;
      receiving the execution results from the remote computing system; and
      sending at least a portion of the execution results, or data derived using the execution results, in response to the first request.

2. The computing system of claim 1, wherein the first request is sent from a database client.

3. The computing system of claim 1, wherein the virtual parameterized database object specifies one more parameters of the parameterized database object.

4. The computing system of claim 1, the operations further comprising:
   determining a constraint for the at least one parameter of the virtual parameterized database object;
   determining that a value for the at least one parameter of the virtual parameterized data object in the first request complies with the constraint; and
   including the value in the second request.

5. The computing system of claim 4, wherein the constraint is a datatype of the first parameter.

6. The computing system of claim 3, the operations further comprising:
   determining whether the first request comprises values for respective parameters of the one or more parameters;
   determining that the first request does not comprise a value for a first parameter of the one or more parameters;
   determining that the first parameter is associated with a default value; and
   including the default value in the second request.

7. The computing system of claim 3, the operations further comprising:
   determining whether the first request comprises values for respective parameters of the one or more parameters;
   determining that the first request does not comprise a value for a first parameter of the one or more parameters;
   determining that the first parameter is not associated with a default value; and
   determining that a value is not required for the first request;
   wherein the generating the second request proceeds based on the determining that a value is not required for the first parameter.

8. The computing system of claim 3, the operations further comprising:
   at the database system, receiving a third request for one or more database operations, at least a first database operation of the one or more database operations being specified for the virtual parameterized database object;
   determining whether the third request comprises values for respective parameters of the one or more parameters;
   determining that the third request does not comprise a value for a first parameter of the one or more parameters;
   determining that the first parameter is not associated with a default value;
   determining that a value is required for the third request; and
   sending an error notification in response to the third request.

9. The computing system of claim 3, wherein at least a first parameter of the one or more parameters modifies a selection of data defined for the parameterized database object.

10. The computing system of claim 3, wherein (1) the parameterized data object is defined with respect to one or more other database objects of the remote computing system, and (2) at least a first parameter of the one or more parameters modifies a value of a data element of at least a first database object of the one or more other database objects.

11. The computing system of claim 1, wherein the parameterized database object is a parameterized view.

12. The computing system of claim 1, wherein the parameterized database object is a user-defined table function and the execution results comprise a results table.

13. The computing system of claim 1, the operations further comprising:
receiving a request to create the virtual parameterized database object, the request to create the virtual parameterized database object comprising a name for the virtual parameterized database object, a name of a parameterized database object to be mapped to the virtual parameterized database object, and a location of the parameterized database object;
in response to the request to create the virtual parameterized database object, sending a third request to the remote computing system, the third request requesting definitional information about the parameterized database object, the definitional information comprising parameter information;
receiving parameter information in response to the third request; and
storing the parameter information in a data dictionary in association with the name of the virtual parameterized database object.

14. The computing system of claim 13, wherein the parameter information comprises a number of parameters of the parameterized database object, an order of parameters of the parameterized database object, and datatypes of respective parameters of the parameterized database object.

15. The computing system of claim 13, wherein the request to create the virtual parameterized database object comprises an identifier that a database object to be created is a virtual database object and an identifier of a type of parameterized database object to which the virtual parameterized database object will be mapped.

16. The computing system of claim 1, wherein the parameterized database object is defined with respect to one or more other database objects of the remote computing system.

17. A method, implementing in a computing system comprising at least one hardware processor and at least one memory coupled to the at least one hardware processor, the method comprising:
at a database system, receiving a first request for one or more database operations, at least a first database operation of the one or more database operations being specified to be performed on a virtual parameterized database object and comprising one or more parameter values;
determining that the virtual parameterized data object is defined in the database system;
retrieving mapping information for the virtual parameterized database object, the mapping information mapping the virtual parameterized database object of the database system to a parameterized database object of a remote computing system, accessed by the database system using data federation, the mapping information comprising a mapping of at least one parameter of the virtual parameterized database object to at least one parameter of the parameterized database object;
using the mapping information, generating a second request for one or more database operations, the second request comprising at least a second database operation corresponding to the at least a first database operation and at least a portion of the one or more parameter values;
sending the second request to the remote computing system, where the remote computing system executes the second request using the parameterized database object and the at least a portion of the one or more parameter values to provide execution results;
receiving the execution results from the remote computing system; and
sending at least a portion of the execution results, or data derived using the execution results, in response to the first request.

18. The method of claim 17, wherein the parameterized database object is a parameterized view or is a user-defined table function.

19. One or more non-transitory computer-readable storage media comprising:
computer-executing instructions that, when executed by a computing system comprising at least one hardware processor and at least one memory coupled to the at least one hardware processor, the computing system implementing a database system, receive a first request for one or more database operations, at least a first database operation of the one or more database operations being specified to be performed on a virtual parameterized database object and comprising one or more parameter values;
computer-executable instructions that, when executed by the computing system, determine that the virtual parameterized data object is defined in the database system;
computer-executable instructions that, when executed by the computing system, retrieve mapping information for the virtual parameterized database object, the mapping information mapping the virtual parameterized database object of the database system to a parameterized database object of a remote computing system, accessed by the database system using data federation, the mapping information comprising a mapping of at least one parameter of the virtual parameterized database object to at least one parameter of the parameterized database object;
computer-executable instructions that, when executed by the computing system, using the mapping information, generate a second request for one or more database operations, the second request comprising at least a second database operation corresponding to the at least a first database operation and at least a portion of the one or more parameter values;
computer-executable instructions that, when executed by the computing system, send the second request to the remote computing system, where the remote computing system executes the second request using the parameterized database object and the at least a portion of the one or more parameter values to provide execution results;
computer-executable instructions that, when executed by the computing system, receive the execution results from the remote computing system; and computer-executable instructions that, when executed by the computing system, send at least a portion of the execution results, or data derived using the execution results.

20. The one or more non-transitory computer-readable storage media of claim 18, wherein the parameterized database object is a parameterized view or is a user-defined table function.

* * * * *